Figure 1:
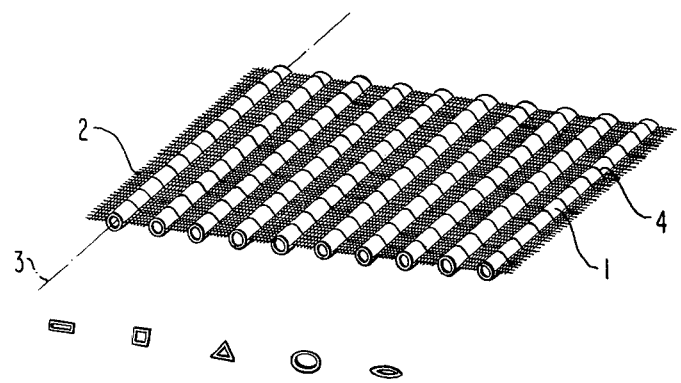

United States Patent [19]

Fratzer et al.

[11] 4,287,097

[45] Sep. 1, 1981

[54] CARRIER MATRIX FOR CATALYSTS AND A PROCESS FOR THE PRODUCTION OF SAME

[75] Inventors: Gerhard Fratzer; Bernhard Beck, both of Rheinfelden; Erwin Dold, Wyhlen; Hans Klebe, Rheinfelden, all of Fed. Rep. of Germany

[73] Assignee: Degussa Aktiengesellschaft, Frankfurt am Main, Fed. Rep. of Germany

[21] Appl. No.: 126,153

[22] Filed: Feb. 29, 1980

Related U.S. Application Data

[63] Continuation-in-part of Ser. No. 102,581, Dec. 11, 1979.

[30] Foreign Application Priority Data

Dec. 11, 1979 [DE]  Fed. Rep. of Germany ....... 2853547

[51] Int. Cl.³ ...................... B01J 21/04; B01J 23/10; B01J 23/86; B01J 35/04
[52] U.S. Cl. ................................... 252/462; 252/465; 252/472; 252/477 R; 422/180; 422/222; 428/256
[58] Field of Search .................. 252/477 R, 462, 465, 252/472; 422/180, 222; 423/213.2, 213.5; 428/256

[56] References Cited

U.S. PATENT DOCUMENTS

| | | | |
|---|---|---|---|
| 3,944,505 | 3/1976 | LaCroix | 252/477 R |
| 3,966,646 | 6/1976 | Noakes et al. | 252/477 R |
| 4,096,095 | 6/1978 | Cairns | 252/465 X |
| 4,162,993 | 7/1979 | Retallick | 252/477 R |

*Primary Examiner*—W. J. Shine
*Attorney, Agent, or Firm*—Beveridge, DeGrandi & Kline

[57] ABSTRACT

An improved carrier matrix for catalysts is described wherein layers are disposed one on top of the other consisting of highly temperature resistant and non-scaling steel formed into a smooth screen into which closed hollow or open supporting profiles of a larger cross section than the screen are woven in or on at parallel distances. Layers of screens provided with profiles may be combined with layers of flat screens or smooth or corrugated sheet metal. The carrier matrix may be coated with a catalytically active carrier such as gamma-aluminum oxide and then receive a coating of a catalytically active metal whereby the resulting product may be used to treat auto exhaust gases for purification.

22 Claims, 2 Drawing Figures

U.S. Patent  Sep. 1, 1981  4,287,097

CARRIER MATRIX FOR CATALYSTS AND A PROCESS FOR THE PRODUCTION OF SAME

REFERENCE TO A RELATED APPLICATION

This application is a continuation-in-part of our copending U.S. patent application Ser. No. 102,581, filed Dec. 11, 1979, and claiming priority of German patent application No. P 28 53 547.9, which is relied on and incorporated herein by reference.

The invention relates to an improved carrier matrix for catalysts with cross-flow effect, as well as with an enlarged geometric surface and improved retaining capability as compared to catalysis-promoting metal oxides present in dipping dispersions as described in German patent application No. P 28 53 547.9 and U.S. patent application Ser. No. 102,581, filed Dec. 11, 1979.

Among the embodiments described in the above patent application, a carrier matrix for catalysts is described which consists of superimposed layers of high temperature resistant and non-scaling steel, whereby the layers consist of a smooth screen onto or into which supporting wires of a larger cross-section are woven at parallel distances in the direction of the desired flow channels, whereby layers of smooth screen or a smooth or corrugated sheet metal alternate with layers of smooth screen with corresponding supporting wires woven into or onto the screen.

It has now been found that an improvement in this carrier matrix with respect to saving of weight, increase in stability and pressure loss may be achieved whenever the supporting wires mentioned are formed into closed hollow or open supporting profiles. Open and closed hollow supporting profiles additionally have the advantage of an enlarged geometric surface of the carrier matrix. The closed hollow supporting profiles may have any cross-sections, thus for example, as round, square, eliptic, rectangular and flat tubes and the open supporting profiles may likewise have the foregoing mentioned cross-sections.

As a result of this a wide margin remains for achieving favorable static stability.

By a closed hollow supporting profile is understood a profile with a closed jacket but open faces. The open supporting profile has an open jacket and is naturally also open in front.

All variations presented in the prior copending application Ser. No. 102,581, filed Dec. 11, 1979 based on the German patent application No. P 28 53 547.9 may be made the basis for variations of the improved matrix.

Thus a length of screen provided with the new closed hollow or open supporting profiles, possibly with an additional length of smooth or corrugated screen or sheet metal, may be wound into a cylinder with helical cross section, having numerous flow channels.

The screen may represent a length with a mesh aperture of 0.18–0.025 mm, preferably 0.1–0.05 mm, especially 0.073 mm and with a wire gauge of 0.15–0.025 mm preferably 0.1–0.05 mm, especially 0.07 mm.

It has turned out to be advantageous to dimension the cross section of the closed hollow or open supporting profile smaller than 5 $mm^2$, whereby the cross section that is to be selected is always determined by the desired dimensions of the flow channels and also by the wire gauge of the screen.

Furthermore, it has turned out to be effective, that the individual flow channels formed by the spacing, woven-in, closed hollow or open supporting profiles have a cross section below 5 $mm^2$ and that the supporting profiles in the plane of the length of screen are at least 1 mm and at most 5 mm apart.

Sheet metals, screens and closed hollow and open profiles which consist of an alloy of iron, chromium, aluminum and possibly also cerium or yttrium are especially suitable as an improved carrier matrix. For the catalytic purification of exhaust gases of internal combustion engines a carrier matrix has been proven suitable, which consists of an alloy of 15% by weight of chromium, 5% by weight of aluminum, and the balance of iron. An alloy of up to 15%, preferably 5 to 15% by weight of chromium, 0.5–12% by weight of aluminum, 0.1–3% by weight of cerium or yttrium, and the balance of iron has also been advantageous. Such alloys may be provided with a superficial aluminum-oxide layer by heating in an oxidizing gas, which layer has a favorable influence in many cases on the adhesion on the catalyst matter to be applied.

A further development, which may be used for the described type of construction of the carrier matrix of the invention consists in the fact that the individual layers at their periphery and/or front are point-welded or are all mutually welded together, or the last layer is welded to the preceding layer, for which purpose electron-ray welding is favorable.

The invention furthermore relates to a carrier matrix as of the described construction, coated with a customary carrier material for catalysts and impregnable directly with solutions of active catalyst metals. At the same time the layers are coated at their surface with a catalysis promoting carrier material, generally a metal oxide of high surface areas. These carrier matrixes of the invention, coated with carrier material are preferred in practical use as rolled cylinders with a helical cross section, and are arranged in a steel jacket by clamping and/or welding. Another possibility for the fixation of the individual layer consists in that holding rings or holding bridges are disposed firmly on the inside diameter of for example, the cylindrical steel jacket or housing or on the converter cones, i.e., they are welded together for example, with one of the two construction units. This will prevent any shifting of the individual helically wound layers in the longitudinal direction of their axis.

The production of the carrier matrixes, which are directly impregnable with catalyst substances, is accomplished in a process wherein the surface of the smooth and corrugated layers or the length of screen provided with the closed hollow or open supporting profiles is coated with a catalysis-promoting carrier material prior to winding up into the cylinder.

The application of the catalysis-promoting carrier material is accomplished according to known coating processes. For this purpose a heat resistant, catalysis promoting carrier material with a relatively high specific surface is applied, by bringing the surfaces to be coated in contact with an aqueous dispersion of the carrier material or with the solution of a salt which may be converted thermally into the carrier material, and after removal of excess dispersion or solution and subsequent drying it is calcined at temperatures generally above 450° C.; wherein these operations are optionally carried out several times. Basically, all heat resistant carrier materials suitable as catalysts may be used. Thus the surfaces to be coated may be brought into contact with an aqueous dispersion of at least one compound from the group of the oxides of Mg, Ca, Sr, Ba, Al, Sc, Y, the lanthanides, the actinides, Ga, In, Tl, Si, Ti, Zr, Hf, Th, Ge, Sn, Pb, V, Nb, Ta, Cr, Mo, W as well as of the carbides, borides and silicides of the transition metals. Preferably, such heat resistant catalyst carrier materials are used, which synergistically promote the effect of the actual catalytically active component. Examples of this are simple or compound oxides, such as $Al_2O_3$, $ZrO_2$, $Ce_2O_3$, $CeO_2$, $SiO_2$, $TiO_2$, or silicates such as barium, boron- or alumosilicate; or titanates, such as barium- or aluminum titanate.

In practice, the various phases of active aluminum oxide, which commonly are designated as active aluminum oxide of the gamma series ($\gamma$-, $\eta$-, $\delta$- $\theta$- or $\xi$-, $\chi$- and $\kappa$-$Al_2O_3$) are preferably used as heat resistant carrier material. This aluminum oxide may be combined or doped with certain elements, which stabilize its crystal structure or raise the oxygen absorbing capacity of the total catalyst. According to a preferred embodiment of the process of the invention therefore, the surface of the tempered structural reinforcer is brought into contact with an aqueous dispersion of aluminum oxide of the gamma series or its hydroxide or oxyhydrate preliminary steps, containing possibly one or more salts of elements from the $II^{nd}$ $III^{rd}$ and $IV^{th}$ main and secondary group of the periodic table of elements. Therefore however, any other compound or preliminary stage of a compound acting synergistically vis a vis the catalytically active component may be applied to the reinforcer by means of a dispersion.

A doping of aluminum oxide of the gamma series with the elements cerium and/or zirconium has a favorable effect for example, on the de-contamination of automobile exhaust gas with the endurance activity and produces beyond that advantages in case of a simultaneous oxydation or reduction of the contaminants of internal combustion engines in a single catalyst bed. For the insertion of these doping elements into the aluminum oxide lattice, it turned out to be effective to produce an aluminum hydroxide or hydroxide preliminary stage containing the elements cerium and/or zirconium, by co-precipitations from cerium-, zirconium- and possibly also aluminum-salt containing solutions and to calcine the preliminary stage into the gamma aluminum oxide-cerium-zirconium oxide matrix. Alternatively, a calcined $Al_2O_3$ of the gamma series may be applied which contains $Ce_2O_3$ or $CeO_2$ and/or $ZrO_2$ or salts of the tri- or quadrivalent cerium and/or of the zirconium and which may be calcined prior to or after application of the catalytically active component at a temperature of 500°–900° C. Preferably this calcination takes place prior to the application of the catalytically active component. For the preparation of the dispersion of the heat resistant carrier material, known techniques, such as grinding, addition of anti-sedimentation auxiliary agents, such as polyethylene imines, stabilized beyond the pH value, and ammonium salts of polymeric carboxylic acids (German AS No. 25 31 769), and aging processes are used.

A favorable variation of the process, because it influences the adhesion of certain catalysis promoting carrier materials favorably, provides for the heating of the smooth and corrugated layers or of the screens provided with the closed hollow or open supporting profiles, in a gas containing oxygen under conditions of temperature and time, whereby a surface layer of aluminum oxide develops from the aluminum contained in the alloy, as a result of which the smooth or corrugated layers or the screens provided with the closed hollow or open supporting profiles may still be coated in the washcoat process with additional catalysis promoting carrier material of the same or of different composition after development of the aluminum oxide coating.

However, it is also possible to coat the smooth and corrugated layers or the lengths of screen provided with the closed hollow or open supporting profiles first by way of the wash-coat process with catalysis-promoting carrier material and then to heat the coated material in an oxygen-containing gas under conditions of time and temperature whereby aluminum oxide oxidizes out of the aluminum contained in the alloy.

For the development of the surface layer from aluminum oxide it will be sufficient to oxidize aluminum oxide from the alloy by heating in air at temperatures of 750°–1100°, preferably 500°–1000° C. and preferably during 1–7, especially around 4 hours.

The coated layers, either smooth and corrugated, or the lengths of screen provided with the closed hollow or open supporting profiles may be wound up into the cylinder with helical cross section and the latter may be forced into a steel jacket under tension and may possibly be welded into it. An object of the invention therefore also resides in a cylindrical carrier matrix, possibly sheated with a steel jacket, adhesively coated with catalysis-promoting metal oxide, and having a helical cross section which matrix is obtainable in accordance with the described process.

Finally, the invention relates also to the use of the described carrier matrix for the production of catalysts, preferably of noble metal and/or base metal catalysts, which are precipitated on catalysis-promoting intermediate carrier material, especially for the purification of the exhaust gases of internal combustion engines and industrial plants.

Figure 2:
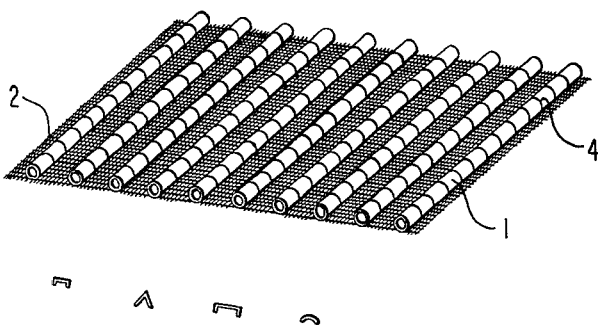

Reference is now made to the attached drawing in which examples for alternative construction designs for the carrier matrixes according to the invention are shown. In the drawing:

FIG. 1 shows a carrier matrix from smooth screen with woven-in closed hollow supporting profiles and FIG. 2 shows a carrier matrix from smooth screen with woven-on closed hollow supporting profiles.

The invention however is not restricted to these variants but covers as well woven-in open hollow supporting profiles as woven-on open hollow supporting profiles (not shown). Cross sections of different closed profiles are shown below FIG. 1 and examples for different open profiles are shown below FIG. 2.

According to FIG. 1 hollow supporting profile 1 is woven into a smooth screen 2 in such a manner that the plane of the screen coincides with the middle axis 3 of the profile and wires 4 of the screen run around the convex surfaces of the profile lying on both sides of that plane.

According to FIG. 2 hollow supporting profile 1 is woven onto a smooth screen 2 in such a manner that the profile rests on the plane of the screen and is supported thereof, the profile being fixed by wires 4 of the screen which run around the convex surface of the profile lying above that plane.

Further variations and modifications of the invention will be apparent to those skilled in the art from the foregoing and are intended to be encompassed by the claims which follow.

We claim:

1. In a carrier matrix for catalysts with cross flow effect as well as with an enlarged geometric surface, comprising layers disposed one on top of the other of highly temperature resistant and non-scaling steel, the improvement wherein the layers comprise at least one smooth screen into which at parallel distances and in the direction of the desired flow channels, closed hollow or open supporting profiles of a larger cross section than the screen are woven on or into the screen.

2. The carrier matrix of claim 1 wherein the layers include layers of smooth screen or smooth or corrugated sheet metal interchange with layers of smooth screen with closed hollow or open supporting profiles woven in or onto the screen.

3. The carrier matrix as defined in claim 1, wherein a web of screen provided with the closed hollow or open supporting profiles is wound up into a cylinder with spiral-shaped cross section having numerous flow channels.

4. The carrier matrix as defined in claim 3 wherein the screen is wound up with another smooth or corrugated web of screen or sheet into a cylinder with spiral-shaped cross section having numerous flow channels.

5. The carrier matrix as defined in claims 1, 2, 3, or 4 wherein the screen represents a web with a mesh aperture of 0.18–0.025 mm and with a wire gauge of 0.15–0.025 mm.

6. The carrier matrix as defined in claims 1, 2, 3 or 4 wherein the cross section of the closed hollow or open supporting profile is dimensioned smaller than 5 $mm^2$, whereby the cross section to be selected is always determined by the desired dimensions of the flow channels and from the wire gauge of the screen.

7. The carrier matrix as defined in claims 1, 2, 3 or 4 wherein the individual flow channels formed by the closed hollow or open supporting profiles woven in and creating distances, have a cross section of below 5 $mm^2$.

8. The carrier matrix as defined in claims 1, 2, 3 or 4 wherein the closed hollow or open supporting profiles are spaced apart at least by 1 mm and at most 5 mm in the plane of the web of the screen.

9. The carrier matrix as defined in claims 1, 2, 3 or 4 wherein the sheet metal, the screen and the closed hollow or open supporting profiles consist of an alloy of iron, chromium, aluminum and possibly also cerium or yttrium.

10. The carrier matrix as defined in claim 9 wherein the alloy consists of 15% by weight of chromium, 5% by weight of aluminum and the rest iron.

11. The carrier matrix as defined in claim 9, wherein the alloy consists of 5 to 15% by weight of chromium, 0.5 to 12% by weight of aluminum, 0.1–3% by weight of cerium or yttrium and the rest iron.

12. The carrier matrix as defined in claims 1, 2, 3 or 4 wherein the individual layers at their periphery and/or face are point-welded or welded altogether with one another or the last layer with the preceding layer.

13. The carrier matrix as defined in claims 1, 2, 3 or 4 wherein the surface of the layers are coated with a catalysis promoting carrier material.

14. The carrier matrix as defined in claims 1, 2, 3 or 4 wherein screen layers are disposed as rolled cylinders with spiral-shaped cross section and arranged in a steel jacket.

15. The carrier matrix as defined in claims 1, 2, 3 or 4 wherein the individual layers wound up spiral-shaped, are secured against shifting by holding rings disposed firmly at the front sides of the steel jacket.

16. A process for the production of the carrier matrix as defined in claim 1 wherein the surface of the smooth or corrugated layers or the screen web provided with the closed hollow or open supporting profiles is coated prior to rolling into a cylinder with the catalysis promoting carrier material.

17. The process as in claim 16, wherein the smooth and corrugated layers or the screen web provided with the closed hollow or open supporting profiles are heated in an oxygen containing gas under conditions of temperature and time under which a surface layer of aluminum oxide develops from the aluminum contained in the alloy.

18. The process as in claim 17 wherein the smooth and corrugated layers or the screen web provided with the closed hollow or open supporting profiles and after development of the aluminum oxide coating, are coated additionally with catalysis promoting carrier material of the same or a different chemical composition in the wash coat process.

19. The process as in claim 15, wherein the smooth and corrugated layers or the screen web provided with the closed hollow or open supporting profiles are first coated by way of the wash coat process with catalysis promoting carrier material, and the coated material is then heated in an oxygen containing gas under conditions of time and temperature whereby aluminum oxide oxidizes out of the aluminum contained in the alloy.

20. The process as in claim 15 wherein aluminum oxide is oxidized out from the alloy by heating on the air at temperatures of 750°–1100° C. during 1–7 hours.

21. The process as in claim 15 wherein the smooth and corrugated layers or the screen web provided with the closed hollow or open supporting profiles are wound up into the cylinder with spiral-shaped cross section and the latter is pressed into a steel jacket under pretension and is possibly welded on in it.

22. A cylinder-shaped carrier matrix, coated in a fixed adhesive manner with catalysis promoting metal oxide and having a spiral-shaped cross section obtainable according to the process of claim 15.

* * * * *